United States Patent
Arumugam Maharaja

(10) Patent No.: US 12,149,511 B2
(45) Date of Patent: Nov. 19, 2024

(54) PROVISIONING SECURED DATA ACCESS TO AUTHORIZED USERS THROUGH LIGHT FIDELITY (LiFi) DATA TRANSMISSION AND A VIRTUAL REALITY DEVICE

(71) Applicant: Bank of America Corporation, Charlotte, NC (US)

(72) Inventor: Raja Arumugam Maharaja, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 263 days.

(21) Appl. No.: 17/819,416

(22) Filed: Aug. 12, 2022

(65) Prior Publication Data
US 2024/0056425 A1  Feb. 15, 2024

(51) Int. Cl.
*H04L 9/40* (2022.01)
*H04B 10/11* (2013.01)

(52) U.S. Cl.
CPC ........ *H04L 63/0428* (2013.01); *H04L 63/083* (2013.01); *H04B 10/11* (2013.01)

(58) Field of Classification Search
CPC ... H04B 10/116; H04B 10/11; H04L 63/0428; H04L 63/083
USPC .......................................................... 726/26
See application file for complete search history.

(56) References Cited

U.S. PATENT DOCUMENTS

| | | | |
|---|---|---|---|
| 7,034,451 B2 * | 4/2006 | Senbonmatsu | H10K 50/86 313/498 |
| 10,068,373 B2 | 9/2018 | Lee et al. | |
| 10,080,971 B2 | 9/2018 | Vock et al. | |
| 10,431,004 B2 | 10/2019 | Yoon et al. | |
| 10,560,587 B2 * | 2/2020 | Latheef | H04N 7/185 |
| 10,650,552 B2 | 5/2020 | Woods et al. | |
| 10,699,520 B2 | 6/2020 | Velu et al. | |
| 10,819,959 B2 | 10/2020 | Palazzolo | |
| 11,068,050 B2 | 7/2021 | Jang | |
| 11,128,471 B2 * | 9/2021 | Haldar | H04L 9/50 |
| 11,182,427 B2 | 11/2021 | Maharajh et al. | |
| 11,322,248 B2 | 5/2022 | Grantcharov et al. | |
| 11,347,054 B2 | 5/2022 | Woods et al. | |
| 11,848,702 B2 * | 12/2023 | Sondericker, III | H04B 10/116 |
| 2006/0150216 A1 | 7/2006 | Herz et al. | |
| 2007/0053513 A1 | 3/2007 | Hoffberg | |
| 2010/0024012 A1 | 1/2010 | Devine et al. | |

(Continued)

*Primary Examiner* — Amare F Tabor

(57) ABSTRACT

A system comprises a light fidelity (LiFi) device. The LiFi device receives, from a receiving device, a first request to provide confidential data. The LiFi device masks the confidential data and modulates light with masked confidential data. The LiFi device emits the light modulated with the masked confidential data toward the receiving device. The LiFi device receives, from a virtual reality device, a second request to unmask the confidential data. The LiFi device communicates a blockchain data entry to a blockchain network, where the blockchain data entry indicates to determine whether a user is authorized to access unmasked confidential data. In response to the user being authorized, the LiFi device receives a confirmation message that indicates the user is authorized to access the unmasked confidential data. The LiFi device modulates light with the unmasked confidential data and emits the modulated light toward the virtual reality device.

20 Claims, 4 Drawing Sheets

(56) References Cited

U.S. PATENT DOCUMENTS

| | | | |
|---|---|---|---|
| 2015/0006403 A1 | 1/2015 | Shear et al. | |
| 2015/0302517 A1 | 10/2015 | Spivack | |
| 2017/0140172 A1* | 5/2017 | Kishimoto | G06K 19/073 |
| 2017/0173262 A1 | 6/2017 | Veltz | |
| 2018/0308569 A1 | 10/2018 | Luellen | |
| 2019/0107991 A1 | 4/2019 | Spivack et al. | |
| 2019/0320515 A1 | 10/2019 | Sadwick | |
| 2019/0347865 A1 | 11/2019 | Hackett et al. | |
| 2020/0118094 A1 | 4/2020 | Haldenby et al. | |
| 2020/0265070 A1 | 8/2020 | Rapaport et al. | |
| 2021/0103449 A1* | 4/2021 | Terpstra | G06F 9/4451 |
| 2021/0345101 A1* | 11/2021 | Hardter | H04L 9/3263 |

\* cited by examiner

PROVISIONING SECURED DATA ACCESS TO AUTHORIZED USERS THROUGH LIGHT FIDELITY (LiFi) DATA TRANSMISSION AND A VIRTUAL REALITY DEVICE

TECHNICAL FIELD

The present disclosure relates generally to cryptography and security, and more specifically to provisioning secured data access to authorized users through light fidelity (LiFi) data transmission and a virtual reality device.

BACKGROUND

As the Internet continues to be utilized by an ever-increasing number of users, fraudulent and criminal activity via the Internet also rises. In data transmission through the Internet, the data is exposed to bad actors and cyberattacks. It is challenging to transmit data through the Internet without exposing the data to bad actors and cyberattacks.

SUMMARY

The system described in the present disclosure provides several practical applications and technical advantages that overcome the current technical problems as described herein. The following disclosure is particularly integrated into a practical application of improving data transmission security and network security technologies. This, in turn, provides an additional practical application of data loss prevention. As such, the technology disclosed in the present disclosure improves the underlying operations of network nodes, servers, switches, and routers that communicate data through the network. These practical applications and technical advantages derived from them are described below.

The present disclosure contemplates a system and a method for provisioning secured data access using light fidelity (LiFi) data transmission and a virtual reality device. In an example scenario, assume that a user wants to access confidential data to perform a task. The confidential data may be stored in a memory associated with a LiFi device. In response to receiving the request, the LiFi device may mask the confidential data and emit light modulated with the masked confidential data to a receiving device. At this stage, the user is not able to view the confidential data because it is masked. The user may operate a virtual reality device and initiate a second request to unmask the confidential data. The disclosed system may determine whether the user is authorized to access the unmasked confidential data based on an access level associated with the user in addition to feedback from authorities. In response to determining that the user is authorized to access the unmasked confidential data, the LiFi device may emit light modulated with the unmasked confidential data to the virtual reality device.

The disclosed system ensures that the receiving device, the LiFi device, and the virtual reality device are not connected to the Internet or the public network. For example, the disclosed system disconnects the internet connectivity software and/or hardware module associated with the receiving device, the LiFi device, and the virtual reality device. In this manner, the data is transmitted from the LiFi device to the receiving device or the virtual reality device without the Internet or the public network. Thus, the data is not exposed to bad actors who have access to the Internet or the public network, and the data is kept secure from cyberattacks. Therefore, the security of the data and the security of the network communication between the LiFi device, receiving device, and the virtual reality device are improved. Accordingly, the disclosed system may be integrated into a practical application of improving data transmission security and network security technologies.

Since the data security and network communication security are improved, bad actors cannot gain unauthorized access to the data (that is being transmitted and/or stored at any of the devices). This provides an additional practical application of securing the LiFi device, receiving device, and the virtual reality device along with network nodes, servers, switches, and routers that communicate the data from unauthorized access.

In one embodiment, a system comprises a LiFi device. The LiFi device comprises a memory operably coupled with a light source and a processor. The memory is configured to store confidential data. The light source is configured to emit light. The processor is configured to receive, from a receiving device, a first request to provide the confidential data. In response to receiving the first request, the processor masks the confidential data. The processor modulates the light with the masked confidential data. The processor emits the light modulated with the masked confidential data toward the receiving device, wherein the receiving device is positioned in a direction of a propagation of the light. The processor receives, from a virtual reality device, a second request to unmask the confidential data. In response to receiving the second request, the processor communicates a blockchain data entry to a blockchain network, wherein the blockchain data entry indicates to determine whether a user is authorized to access the unmasked confidential data. In response to the user being authorized to access the unmasked confidential data, the processor receives, from the blockchain network, a confirmation message that indicates the user is authorized to access the unmasked confidential data. The processor unmasks the masked confidential data. The processor modulates the light with the unmasked confidential data. The processor emits the light modulated with the unmasked confidential data toward the virtual reality device, wherein the virtual reality device is positioned in a direction of a propagation of the light.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for provisioning secured data access to authorized users through light fidelity (LiFi) data transmission and a virtual reality device. Embodiments of the present disclosure and its advantages may be understood by referring to FIGS. 1 through 4. FIGS. 1 through 4 are used to describe a system and method for anomaly detection within a virtual environment.

System Overview

Figure 1:
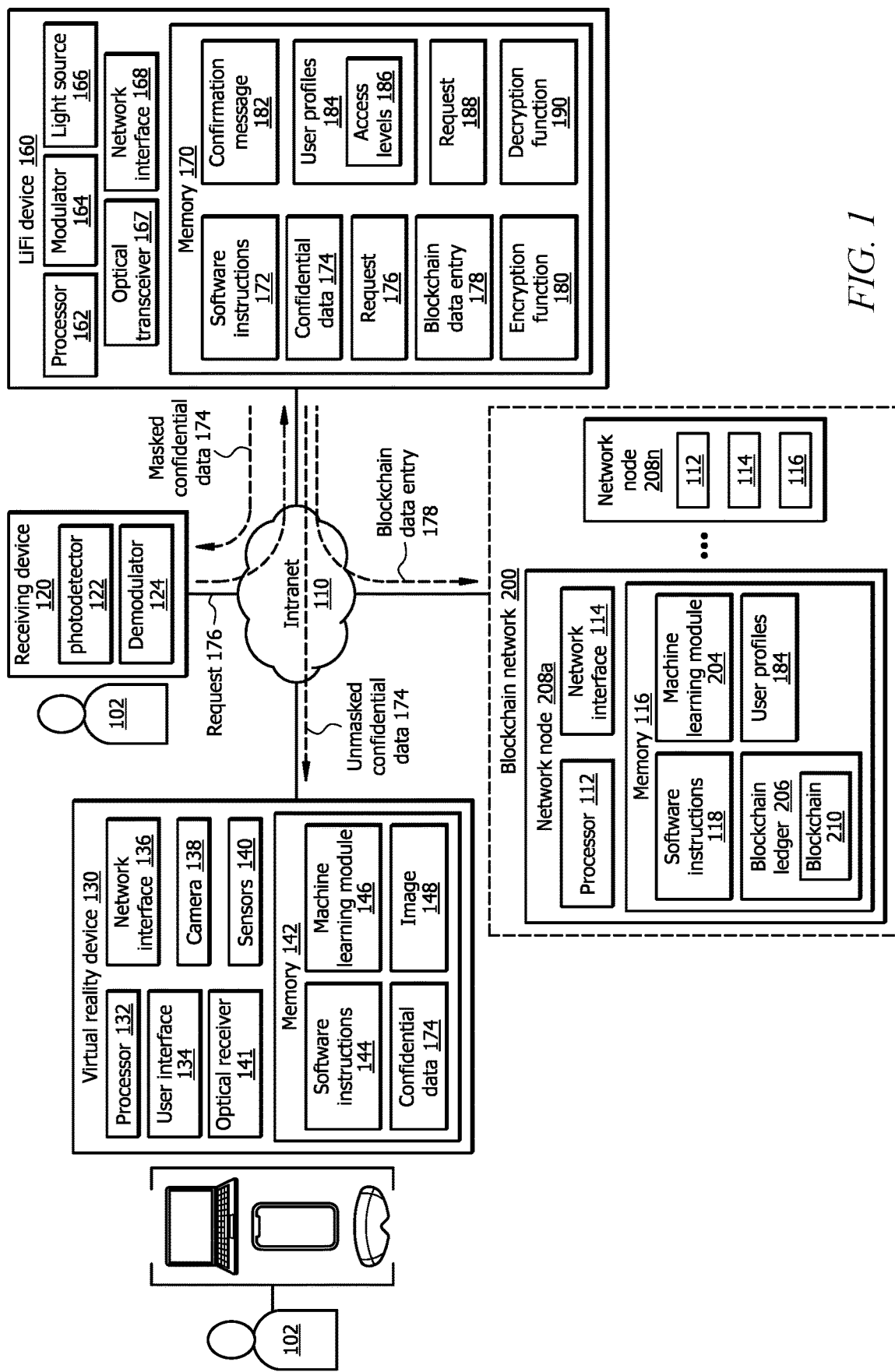
FIG. 1 illustrates an embodiment of a system configured to provision secured data access to authorized users through light fidelity (LiFi) data transmission and a virtual reality device.

FIG. 1 illustrates an embodiment of a system 100 that is generally configured to provide secured data access to authorized users through LiFi data transmission and a virtual reality device. In certain embodiments, the system 100 comprises a LiFi device 160 communicatively coupled to a receiving device 120, a virtual reality device 130, and a blockchain 210 via an intranet 110. Intranet 110 enables the communication between the components of the system 100. LiFi device 160 comprises a processor 162 in signal communication with a memory 170. Memory 170 stores software instructions 172 that when executed by the processor 172, cause the LiFi device 160 to perform one or more operations described herein. In other embodiments, system 100 may not have all of the components listed and/or may have other elements instead of, or in addition to, those listed above.

In an example scenario, assume that a user 102 wants to access confidential data 174. One potential approach is to transmit the confidential data 174 to the use 102. However, this approach suffers from several drawbacks. For example, the user 102 may be an imposter who is not authorized to access confidential data 174. In another example, the confidential data 174 may be transmitted via the public network which exposes the confidential data 174 to cyberattacks.

The system 100 is configured to provide secured data access to authorized users using LiFi data transmission and a virtual reality device 130. The system 100 determines the identity of the user 102 and determines if the user 102 is authorized to access the confidential data 174. The system 100 also ensures that the LiFi device 160, the receiving device 120, the virtual reality device, and the blockchain network 200 are not connected to the public network or Internet. For example, the disclosed system 100 disconnects public network connectivity software and/or hardware module associated with the receiving device 120, the LiFi device 160, the virtual reality device 130, and network nodes 208. In another example, any of the components of the system 100 is instructed to disconnect its internet connectivity software and/or hardware module. In this manner, the confidential data 174 is transmitted from the LiFi device 160 to the receiving device 120 or the virtual reality device 130 without the Internet or the public network. Thus, the confidential data 174 is not exposed to bad actors who have access to the Internet or the public network, and the confidential data 174 is kept secure from cyberattacks. Therefore, the security of the confidential data 174 and the security of the network communication between the LiFi device 160, receiving device 120, and the virtual reality device 130 are improved. Accordingly, the disclosed system may be integrated into a practical application of improving data transmission security and network security technologies. Since the data security and network communication security are improved, bad actors cannot gain unauthorized access to the confidential data 174 (that is being transmitted and/or stored at any of the devices of the system 100). This provides an additional practical application of securing the LiFi device 160, receiving device 120, nodes 208, and the virtual reality device 130 along with network nodes, servers, switches, and routers that communicate the data from unauthorized access.

System Components

Intranet

Intranet 110 may be any suitable type of private wireless and/or wired network. The intranet 110 is not connected to the Internet or public network. The intranet 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network that is not connected to the Internet.

Receiving Device

Receiving device 120 is generally any hardware device that is configured to process data and interact with users. Examples of the receiving device 120 include but are not limited to, a personal computer, a desktop computer, a workstation, a server, a laptop, a tablet computer, a mobile phone (such as a smartphone), etc. The receiving device 120 may include a user interface, such as a display, a microphone, keypad, or other appropriate terminal equipment usable by users. The receiving device 120 may include a hardware processor, memory, and/or circuitry (not explicitly shown) configured to perform any of the functions or actions of the receiving device 120 described herein. For example, a software application designed using software code may be stored in the memory and executed by the processor to perform the functions of the receiving device 120. The receiving device 120 is configured to communicate with other devices via the intranet 110. For example, the receiving device 120 may include a processor that is an instance of the processor 162 in signal communication with a memory that is an instance of the memory 170 and a network interface that is an instance of the network interface 168.

The receiving device 120 may also include a photodetector 122 operably coupled with a demodulator 124, e.g., via wired and/or wireless communications. Photodetector 122 may include a photodiode device that is configured to capture emitted light/optical signal. The photodetector 122 may also be configured to convert light (e.g., modulated with data) into current or voltage, and vice versa. The receiving device 120 (e.g., via its processor and demodulator 124) may be configured to convert the current or voltage into digital data, e.g., by implementing an analog to digital conversion. In certain embodiments, the photodetector 122 may include an optical sensor, a light sensor, a LiFi sensor, a visible light communication (VLC) sensor, and the like. The photodetector 122 may include any type of optical receiver and transceiver. An exemplary photodetector 122 circuit includes one or more LEDs for transmission of light and one or more photodetectors for receiving transmitted light. The term "photodetector" includes "photodiodes" and all other devices capable of converting light into current or voltage. The terms photodetector and photodiode are used interchangeably herein. The use of the term photodiode is not intended to restrict the scope of the present disclosure from using alternative photodetectors that are not specifically mentioned herein. The photodetector 122 may have a sensing surface that when placed in the direction of the light or optical signal (e.g., emitted from the light source 166 of the LiFi device 160), captures the emitted light or the emitted optical signal and forwards it to the demodulator 124. In certain embodiments, the photodetector 122 may be internal with respect to the receiving device 120 and integrated into the receiving device 120. In certain embodiments, the photodetector 122 may be external with respect to the receiving device 120 and operably coupled to the receiving device 120 via wired and/or wireless communications.

Demodulator 124 may be implemented in hardware and/or software and is generally configured to demodulate emitting light received from the LiFi device 160. In certain embodiments, the demodulator 124 may include any sensor and/or circuitry configured to demodulate light and optical signals. The demodulator 124 is configured to demodulate the emitted light or optical signal. For example, when the confidential data 174 is modulated with the light or optical signal at the LiFi device 160 and the light is emitted toward the receiving device 120, the photodetector 122 captures the emitted light and forwards it to the demodulator 124. The demodulator 124 demodulates the emitted light and extracts the confidential data 174 from the emitted light. In certain embodiments, the demodulator 124 may be internal with respect to the receiving device 120 and integrated into the receiving device 120. In certain embodiments, the demodulator 124 may be external with respect to the receiving device 120 and operably coupled to the receiving device 120 via wired and/or wireless communications.

In certain embodiments, the demodulator 124 may be implemented in a software modulating program included in the software instructions (stored in the memory of the receiving device 120, not explicitly shown) that when executed by the processor of the receiving device 120 cause the receiving device 120 to demodulate data from the received emitting light or optical signal, such as the confidential data 174.

In certain embodiments, the demodulator 124 may be implemented by a hardware device that includes processing circuitry configured to modulate emitting light or optical signal with data, such as the confidential data 174. Similarly, the demodulator 124 is configured to demodulate data from the emitted light or optical signal.

The receiving device 120 is configured to transmit a request 176 to the LiFi device 160. For example, a user 102 may operate the receiving device 120 to transmit a request 176 to the LiFi device 160 via the intranet 110. The request 176 may indicate to provide the confidential data 174. The user 102 logs into the receiving device 120 using their credentials. The user credentials and other information associated with the user 102 (e.g., a name, a department, a task for which the confidential information 174 is requested, etc.) may be included in the request 176.

Virtual Reality Device

Virtual reality device 130 is generally any device that is configured to process data and interact with users 102. Examples of the virtual reality device 130 include but are not limited to, a personal computer, a desktop computer, a workstation, a server, a laptop, a tablet computer, a mobile phone (such as a smartphone), smart glasses, Virtual Reality (VR) glasses, an augmented reality device, an Internet-of-Things (IoT) device, or any other suitable type of device. The virtual reality device 130 may include a processor 132, user interfaces 134, a network interface 136, a camera 138, sensors 140, an optical receiver 141, and a memory 142. The components of the virtual reality device 130 are operably coupled to one another, e.g., via wired and/or wireless communications. In other embodiments, the virtual reality device 130 may not have all of the components listed and/or may have other elements instead of, or in addition to, those listed above. The virtual reality device 130 may be configured as shown or in any other configuration.

Processor 132 comprises one or more processors operably coupled to the memory 142. The processor 132 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 132 may be a programmable logic device, a microcontroller, a microprocessor, or any suitable number and combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 may register the supply operands to the ALU and store the results of ALU operations. The processor 132 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 144) to perform one or more operations described herein. In this way, processor 132 may be a special-purpose computer designed to implement one or more functions disclosed herein. In an embodiment, the processor 132 is implemented using logic units, FPGAs, ASICs, DSPs, or any other suitable hardware. The processor 132 is configured to operate as described in FIGS. 1-4. For example, the processor 132 may be configured to perform one or more operations of method 400 as described in FIG. 4.

Use interfaces 134 may generally include any peripherals, such as a display screen, a microphone, keypad, buttons, a menu of operations, or other appropriate terminal equipment usable by user 102. The user 102 may interact with and operate the virtual reality device 130 using the user interfaces 134.

Network interface 136 is configured to enable wired and/or wireless communications. The network interface 136 may be configured to communicate data between the virtual reality device 130 and other components and devices of the system 100. For example, the network interface 136 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 132 may be configured to send and receive data using the network interface 136. The network interface 136 may be configured to use any suitable type of communication protocol.

Camera 138 may be or include any camera that is configured to capture images 148 and videos of a field of view in front of the camera 138. Examples of the camera 138 may include charge-coupled device (CCD) cameras and complementary metal-oxide semiconductor (CMOS) cameras, and the like. The camera 138 is a hardware device that is configured to capture images and videos continuously, at predetermined intervals, or on demand. For example, when the user 102 operates the virtual reality device 120, the camera 138 may capture images 148 of the user 102 for determining and verifying the identity of the user 102. The camera 138 may transmit the captured images 148 of the user 102 to the processor 132 for processing. The processor 132 may feed the images 148 of the user 102 to the machine learning module 146 to determine and verify the identity of the user 102, e.g., using facial recognition.

Sensors 140 may be or include any type of sensors. Examples of the sensors 140 include a global positioning system (GPS) sensor, an optical sensor, a VLC sensor, a light sensor. The GPS sensor comprises any device that is configured to estimate or determine a geographic location of the virtual reality device 130. For example, the GPS sensor may determine the GPS location coordinate of the virtual reality device 130.

Optical receiver 141 may include one or more photodetectors for receiving transmitted light, e.g., emitted from the LiFi device 160. The optical receiver 141 is configured to convert light into current or voltage. For example, the optical receiver 142 may include photodetectors, photodiodes, light sensors, VLC sensors, LiFi sensors, and all other devices capable of converting light into current or voltage. The processor 132 may be configured to convert or translate the current or voltage into digital data, e.g., by implementing an analog to digital conversion.

Memory 142 may be volatile or non-volatile and may comprise read-only memory (ROM), random-access memory (RAM), ternary content-addressable memory (TCAM), dynamic random-access memory (DRAM), and static random-access memory (SRAM). The memory 142 may include one or more of a local database, cloud database, network-attached storage (NAS), etc. The memory 142 comprises one or more disks, tape drives, or solid-state drives, and may be used as an over-flow data storage device, to store programs when such programs are selected for execution, and to store instructions and data that are read during program execution. The memory 142 may store any of the information described in FIGS. 1-4 along with any other data, instructions, logic, rules, or code operable to implement the function(s) described herein when executed by processor 132. For example, the memory 142 may store software instructions 144, confidential data 174, machine learning module 146, image 148, and/or any other data or instructions. The software instructions 144 may comprise any suitable set of instructions, logic, rules, or code operable to execute the processor 132 and perform the functions of the virtual reality device 130, such as some or all of those described in FIGS. 1-4.

Machine learning module 146 may be implemented by the processor 132 executing the software instructions 144 and is generally configured to determine the identity of the user 102 from images 148 of the user 102 captured by the camera 138. In certain embodiments, the machine learning module 146 may include a support vector machine, neural network, random forest, k-means clustering, Tree-based algorithm, Random Forest algorithm, etc. In certain embodiments, the machine learning module 146 may include image processing, facial recognition, object recognition, video processing algorithms, and the like. For example, when an image 148 of the user 102 is sent to the processor 132 for processing, the virtual reality device 130 may feed the image 148 of the user 102 to the machine learning module 146. The machine learning module 146 extracts facial features of the user 102 from the image 148. The virtual reality device 130 may transmit the extracted facial features to the LiFi device 160 to compare the extracted facial features with features of images of users stored in the user profile 184. If a matching profile with corresponding features is found, the LiFi device 160 determines the identity of the user 102 and communicate the same to the virtual reality device 130.

Confidential data 174 may include any data that is private, such as user information, organization information, information related to clients of organizations, user credentials, confidential projects, confidential tasks, among others.

LiFi Device

LiFi device 160 is generally a hardware device that is configured to transmit data via emitting light, such as optical signals. The LiFi device is further configured to provide services and software and/or hardware resources to other components of the system 100. In the illustrated embodiment, the LiFi device 120 may include a processor 162 in signal communication with a modulator 164, a light source 166, an optical transceiver 167, a network interface 168, and a memory 170. The components of the LiFi device 160 are operably coupled with one another, e.g., via wired and/or wireless communications. The LiFi device 120 is configured to modulate data into light or optical signal to be emitted from the light source 166 by the processor 162 executing software instructions 172. The processor 162 may use a VLC modulation technique, its variants, and/or other modulation techniques. The LiFi device 120 may be configured to use light emitted from the light source 166 as a medium to transmit data. The LiFi device 120 is configured to communicate with other components of the system 100 via the intranet 110.

Processor 162 comprises one or more processors operably coupled to the memory 170. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations. The processor 162 may register the supply operands to the ALU and stores the results of ALU operations. The processor 162 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 172) to perform one or more operations described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-4. For example, the processor 162 may be configured to perform one or more operations of method 400 as described in FIG. 4.

Modulator 164 may be implemented in hardware and/or software and is generally configured to modulate emitting light with data. In certain embodiments, the modulator 164 may be implemented in a software modulating program included in the software instructions 172 that when executed by the processor 162 cause the LiFi device 160 to modulate emitting light or optical signal with data, such as the confidential data 174. In certain embodiments, the modulator 174 may be implemented by a hardware device that includes processing circuitry configured to modulate emitting light or optical signal with data, such as the confidential data 174. Similarly, the modulator 164 is configured to demodulate the emitting light or optical signal from the data, such as the confidential data 174.

Light source 166 may include any source or device that is configured to emit light or optical signal. The light source 166 may be further configured to receive and transmit visible light according to a predetermined protocol such as a variant of IEEE 802.15.7 or other VLC protocol. The light source 166 may include light-emitting elements which transmit modulated data on visible light and light sensing elements that receive modulate data on visible light. The light source 166 may also include light-emitting elements which transmit modulated data on invisible light and light sensing elements that receive modulate data on invisible light. In the present disclosure, light may be referred to as an optical signal.

In an exemplary embodiment, the light source 166 may include one or more modulated LED lighting fixtures that are used as transmitters and one or more photo/optical sensors which are used as receivers. In this manner, the LiFi device 160 can work both as a lighting source and as an infrastructure data communications device. The light source 166 may be faced in the direction on the receiving device 120 (and/or the photodetector 122). As such, the photodetector 122 at the receiving device 120 may receive data being transmitted via the light emitted from the light source 166.

Optical transceiver 167 may include one or more photodetectors for receiving transmitted light. The optical transceiver 167 may be configured to convert light into current or voltage and vice versa. In this manner, the components of the LiFi device 160 are configured to convert electrical signals associated with the confidential data 174 into light, and transmit light modulated with confidential data 174, and vice versa. An exemplary optical transceiver 167 includes one or more LEDs (e.g., light sources 166) for transmission of light and one or more photodetectors for receiving transmitted light. The term optical transceiver 167 includes photodetectors and photodiodes and all other devices capable of converting light into current or voltage. The use of the term optical transceiver 167 is not intended to restrict the scope of the present disclosure from using alternative optical transceivers 167 that are not specifically mentioned herein.

Network interface 168 is configured to enable wired and/or wireless communications. The network interface 168 may be configured to communicate data between the LiFi device 160 and other components and devices of the system 100. For example, the network interface 168 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 162 may be configured to send and receive data using the network interface 168. The network interface 168 may be configured to use any suitable type of communication protocol.

Memory 170 may be volatile or non-volatile and may comprise ROM, RAM, TCAM, DRAM, and SRAM. The memory 170 may include one or more of a local database, cloud database, NAS, etc. The memory 170 comprises one or more disks, tape drives, or solid-state drives, and may be used as an over-flow data storage device, to store programs when such programs are selected for execution, and to store instructions and data that are read during program execution. The memory 170 may store any of the information described in FIGS. 1-4 along with any other data, instructions, logic, rules, or code operable to implement the function(s) described herein when executed by processor 162. For example, the memory 170 may store software instructions 172, confidential data 174, request 176, blockchain data entry 178, encryption function 180, confirmation message 182, user profiles 184, request 188, decryption function 190, and/or any other data or instructions. The software instructions 172 may comprise any suitable set of instructions, logic, rules, or code operable to execute the processor 162 and perform the functions of the LiFi device 160, such as some or all of those described in FIGS. 1-4.

Blockchain Network

Blockchain network 200 is a peer-to-peer network of network nodes 208a-n, and is generally configured to distribute blockchain data entries, records, or transfers (and any other data/information) among the network nodes 208a-n In certain embodiments, blockchain network 200 is a public blockchain network. In certain embodiments, blockchain network 200 is a private blockchain network. For example, membership in blockchain network 200 may be limited to nodes 208 registered as belonging to and/or affiliated with the organization to which the LiFi device 160 belongs. In certain embodiments, the LiFi device 160 may be a member of blockchain network 200 (e.g., as a node 208 in blockchain network 200).

Figure 2:
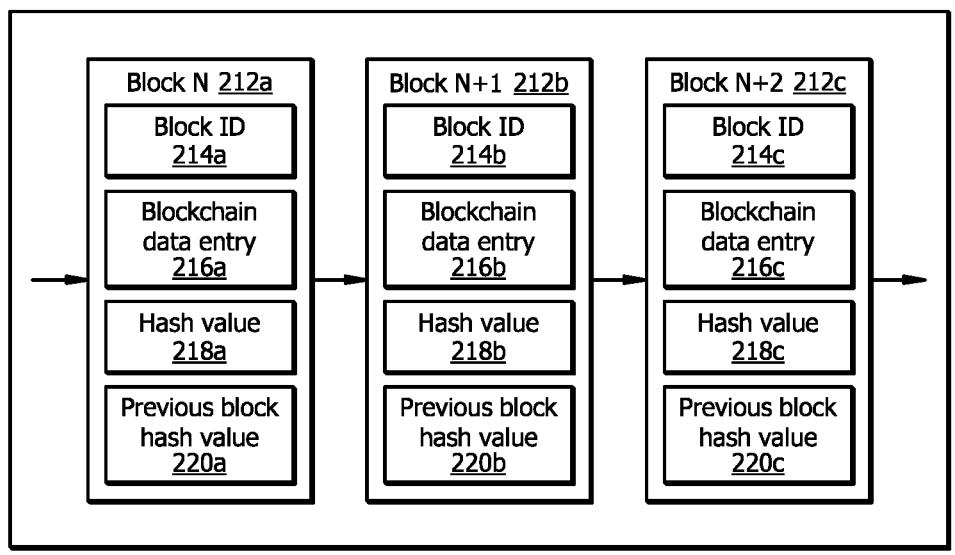
FIG. 2 illustrates an example embodiment of a blockchain of system of FIG. 1.

The blockchain network 200 may comprise any number of network nodes 208 to form a distributed network that maintains a blockchain 210 (see FIG. 2). Each network node 208 may comprise a computing device, a virtual machine, a server, a workstation, and/or the like. Each network node 208a through 208n of blockchain network 200 stores a blockchain ledger 206 configured to store a copy of a blockchain 210 (see FIG. 2).

Each network nodes 208a-208n may be an instance of a network node 208. The network node 208 may include a hardware processor 122 in signal communication with a network interface 114 and a memory 116. Processor 112 comprises one or more processors operably coupled to the memory 116. The processor 112 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 112 may be a programmable logic device, a microcontroller, a microprocessor, or any suitable number and combination of the preceding. The one or more processors are configured to process data and may be implemented in hardware or software. For example, the processor 112 may be 8-bit, 16-bit, 32-bit, 64-bit, or of any other suitable architecture. The processor 112 may include an ALU for performing arithmetic and logic operations. The processor 112 may register the supply operands to the ALU and stores the results of ALU operations. The processor 112 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 118) to perform one or more operations described herein. In this way, processor 112 may be a special-purpose computer designed to implement one or more functions disclosed herein. In an embodiment, the processor 112 is implemented using logic units, FPGAs, ASICs, DSPs, or any other suitable hardware. The processor 112 is configured to operate as described in FIGS. 1-4. For example, the processor 112 may be configured to perform one or more operations of method 400 as described in FIG. 4.

Network interface 114 is configured to enable wired and/or wireless communications. The network interface 114 may be configured to communicate data between the network node 208 and other components and devices of the system 100. For example, the network interface 114 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 112 may be configured to send and receive data using the network interface 114. The network interface 114 may be configured to use any suitable type of communication protocol.

Memory 116 may be volatile or non-volatile and may comprise ROM, RAM, TCAM, DRAM, and SRAM. The memory 116 may include one or more of a local database, cloud database, NAS, etc. The memory 116 comprises one or more disks, tape drives, or solid-state drives, and may be used as an over-flow data storage device, to store programs when such programs are selected for execution, and to store instructions and data that are read during program execution. The memory 116 may store any of the information described in FIGS. 1-4 along with any other data, instructions, logic, rules, or code operable to implement the function(s) described herein when executed by processor 112. For example, the memory 116 may store software instructions 118, blockchain ledger 206, machine learning module 204, user profiles 184, and/or any other data or instructions. The software instructions 118 may comprise any suitable set of instructions, logic, rules, or code operable to execute the processor 112 and perform the functions of the network node 208, such as some or all of those described in FIGS. 1-4.

The machine learning module 204 may be implemented by the processor 112 executing the software instructions 118, and is generally configured to determine whether or not a user 102 is authorized to access unmasked confidential data 174. In certain embodiments, the machine learning module 204 may include a support vector machine, neural network, random forest, k-means clustering, Tree-based algorithm, Random Forest algorithm, etc. In certain embodiments, the machine learning module 204 may include or be implemented by supervised, semi-supervised, or unsupervised machine learning techniques.

For example, in an example scenario, assume that the user 102 has requested to view and access unmasked confidential data 174 for the first time. The network node 208 may receive the request 188 of the user 102 via the LiFi device 160. The network node 208 (e.g., via the machine learning module 204) may request input from the authorities (associated with the organization that the LiFi device 160 and/or the confidential data 174 belongs) regarding the user's authentication for accessing the unmasked confidential data 174. The network node 208 may receive feedback 310 (see FIG. 3) from the authorities regarding the user's authentication for accessing the unmasked confidential data 174. The machine learning module 204 may learn from the feedback 310 (see FIG. 3) from the authorities regarding the user's authentication for accessing the unmasked confidential data 174. For example, for subsequent requests 176 from the user 102, the machine learning module 204 may use the learned information from the feedback of the authorities to determine if the user 102 is authorized to access the unmasked confidential data 174. The network node 208 (e.g., via the machine learning module 204) may also search for the user profile 184 associated with the user 102 among the user profiles 184 based on at least one of an identifier of the user 102, a name of the user, etc. included in the request 188. The network node 208 (e.g., via the machine learning module 204) may find a corresponding or matching profile that belongs to the user 102. The network node 208 (e.g., via the machine learning module 204) may access the access level 186 of the user 102. If the access level 186 of the user 102 indicates that the user 102 is authorized to access the unmasked confidential data 174, the network node 208 (e.g., via the machine learning module 204) determines that the user 102 is authorized to access the unmasked confidential data 174. The network node 208 may communicate this information to the LiFi device 160 in a confirmation message 182. For subsequent requests 176 from the user 102, if there is any change in the access level 186 of the user 102 for accessing the unmasked confidential data 174, the machine learning module 204 may update its determination regarding the user's authentication for accessing the unmasked confidential data 174 according to the updated access level 186 of the user 102. This operation is described in greater detail in FIG. 3. The blockchain ledger 206 stores a copy of a blockchain 210. An example blockchain 210 is described in greater detail in FIG. 2.

Referring to FIG. 2, the blockchain 210 generally refers to a distributed database shared by a plurality of network nodes 208 in a network. The blockchain ledger 208 stores the blockchain 210. The blockchain 210 comprises blocks 212 which contain every blockchain data entry 216 executed in the network. For example, the blockchain 210 includes a set of blockchain data entry 216*a-c* executed in blockchain network 200 of FIG. 1.

Blockchain 210 links together blocks 212*a-c* of data, which store identifiable units called blockchain data entry 216. The blockchain data entry 216 may be interchangeably referred to herein as a blockchain data entry or a blockchain transfer. The blockchain data entries 216*a-c*, stored in blocks 212*a* through 124*c*, may include information, files, and/or any other suitable type of data. For example, blockchain data entries 216*a-c* may include requests 188. With each request 188, a new blockchain data entry 216 may be issued and a new block 212 is generated and added to the blockchain 210 by the LiFi device 160 and/or the blockchain network 200. The operation of issuing new blockchain entries 216 is described in greater details in FIG. 3.

Each block 212*a-c* in the blockchain 210 comprises a block identifier (ID) 214*a-c* and information derived from a preceding block 212*a-c*. For example, every block 212*a-c* in the blockchain 210 includes a hash 220*a-c* of the previous block 212*a-c*. By including the hash 220*a-c*, the blockchain 210 comprises a chain of blocks 212*a-c* from a genesis block 212 (e.g., block 212*a* or a block before block 212*a*) to the current block 212*c*. Each block 212*a-c* is guaranteed to come after the previous block 212*a-c* chronologically because the previous block's hash 220*a-c* would otherwise not be known. In one embodiment, blocks 212*a-c* in a blockchain 210 may be linked together by identifying a preceding block 212*a-c* with a cryptographic checksum (e.g., secure hash algorithm (SHA)-256) of its contents (e.g., the sensor data 124 and additional metadata including block ID 214, hash value 218, and previous block hash value 220) which serves as each block's unique identifier. Links are formed by storing the cryptographic checksum identifier of one block 212*a-c* in the metadata of another block 212*a-c*, such that the former block 212*a-c* becomes the predecessor of the latter block 212a-c. In this way, the blocks 212a-c form a chain that can be navigated from block-to-block by retrieving the cryptographic checksum of a particular block's predecessor from the particular block's own metadata. Each block 212a-c is computationally impractical to modify once it has been in the blockchain because every block 212a-c after it would also have to be regenerated. These features protect data stored in the blockchain 210 from being modified by bad actors which provides information security. When a network node 208 creates an entry (e.g. one or more blockchain data entries 216a-c in a block 212a-c) in its blockchain ledger 206, the blockchain 210 for all other network nodes 208a-n (see FIG. 1) in the distributed network is also updated with the new entry. Thus, data entered in a blockchain 210 is available and accessible to every network node 208a-n (see FIG. 1) with a copy of the blockchain ledger 208. This allows the data stored in the block 212a-c to be accessible for inspection and verification at any time by any device with a copy of the blockchain ledger 206.

Referring back to FIG. 1, the blockchain network 200 is configured to establish consensus among the network nodes 208a-n about the present state of the blockchain ledger 206. For example, each network node 208a-n comprises a processor in signal communication with a memory storing software instructions that when executed by the processor, cause the network nodes 132a-n to implement a consensus protocol procedure through which all the network nodes 132a-n of the blockchain network 200 reach a common agreement about the present state of the blockchain ledger 206. In this way, each network nodes 132a-n achieves reliability in the blockchain network 200 and establishes trust between the network nodes 132a-n in a distributed computing environment. Essentially, the consensus protocol makes sure that every new block 212a-c (see FIG. 2) that is added to the blockchain 210 (see FIG. 2) is the one and only version of the truth that is agreed upon by all the block 212a-c (see FIG. 2) in the blockchain 210 (see FIG. 2).

Example Operational Flow for Provisioning Secured Data Access

Figure 3:
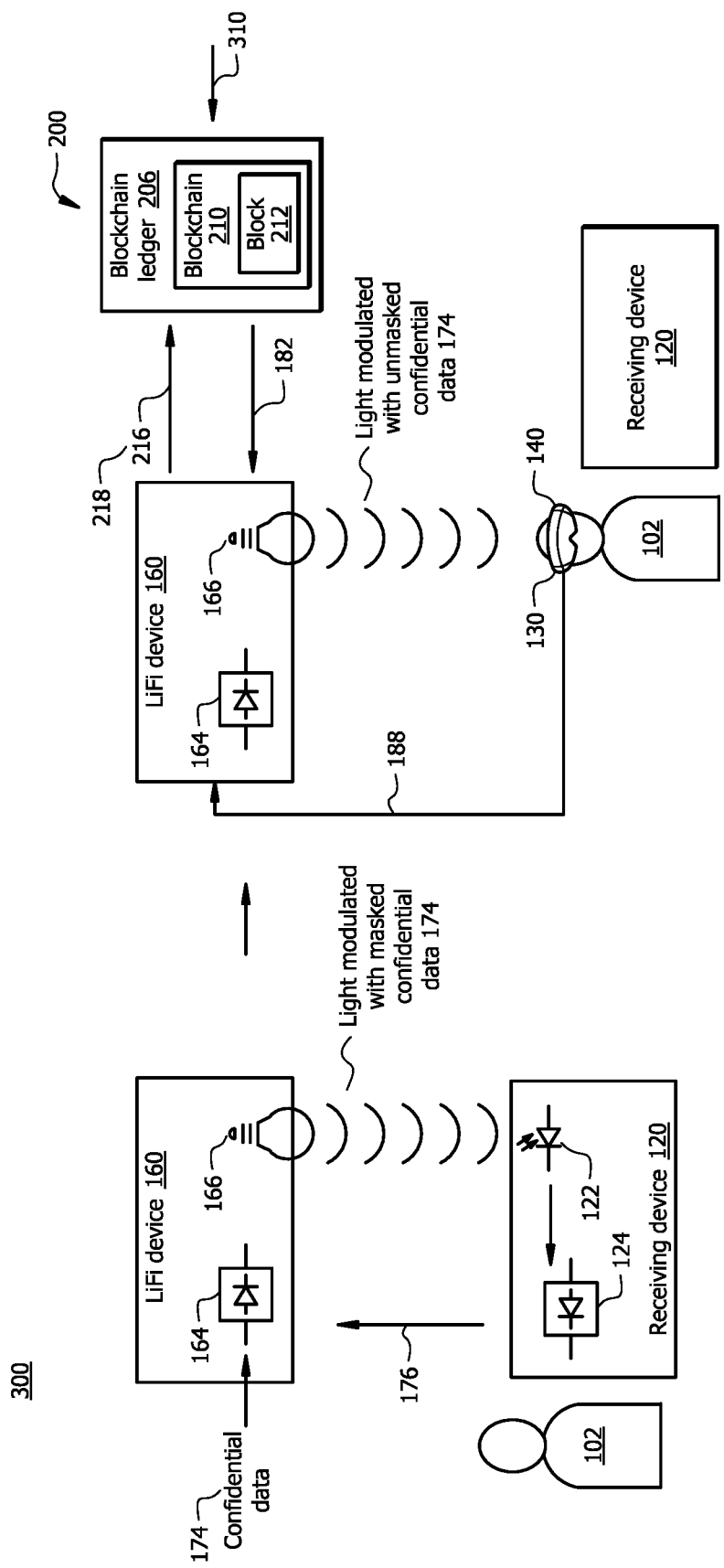
FIG. 3 illustrates an example operational flow of system of FIG. 1.

FIG. 3 illustrates an example operational flow 300 of the system 100 (see FIG. 1) for provisioning secured data access to authorized users 102 via LiFi data transmission (e.g., from the LiFi device 160) and a virtual reality device 130. The operational flow 300 may begin when a user 102 requests to access the confidential data 174. The user 102 may operate the receiving device 120 to transmit the request 176 to receive and access the confidential data 174. The receiving device 120 transmits the request 176 to the LiFi device 160. The request 176 may include any information associated with the user 102, the task, an identifier (e.g., a file name) of the confidential data 174, along with any other information. The LiFi device 160 receives the request 176. The LiFi device 160 may search for the confidential data 174 in the memory 170 using the provided identifier of the confidential data 174.

Masking the Confidential Data

In response to receiving the request 176 and finding the confidential data 174, the LiFi device 160 may mask the confidential data 174. In certain embodiments, the LiFi device 160 may mask the confidential 174 using an encryption function 180 and an encryption key. In certain embodiments, the LiFi device 160 may mask the confidential data 174 by blocking or covering the confidential data 174. In certain embodiments, the LiFi device 160 may mask the confidential data 174 by changing one or more variables of the confidential data 174. For example, the LiFi device 160 may change all the variables, letters, numbers of the confidential data 174 to one or more random or arbitrary characters, such as "A," "1," or "#." In another example, the LiFi device 160 may change all the variables, letters, numbers of the confidential data 174 to one or more predetermined characters, such as "B" "2," or "@."

The LiFi device 160 (e.g., via the modulator 164) may modulate the light (e.g., optical signal) associated with the light source 166 with the masked confidential data 174. The LiFi device 160 may transmit or emit the optical signal modulated with the masked confidential data 174 to (or toward) the receiving device 120. The receiving device 120 (or at least the photodetector 124) is positioned in a direction of the propagation of the optical signal or light emitting from the light source 166. In certain embodiments, the light source 166 may be switched on when the LiFi device 160 determines that the user 102 is authorized to access the confidential data 174, e.g., by a switch-on instruction from the processor 162.

The photodetector 124 at the receiving device 120 captures the emitted light modulated with the masked confidential data 174. The photodetector 124 forwards the captured emitted light modulated with the masked confidential data 174 to the demodulator 124. The demodulator 124 demodulates the masked confidential data 174 from the light. The receiving device 120 may display the masked confidential data 174 on a display screen of the receiving device 120. After the LiFi data transmission or emission is complete, the light source 166 may be switched off, e.g., by a switch-off instruction from the processor 162.

Unmasking the Confidential Data

The user 102 may want to access the unmasked confidential data 174. The user 102 may operate the virtual reality device 130 to initiate a request to access 188 to access the unmasked confidential data 174. For example, assuming that the virtual reality device 130 is smart glasses, the user 102 may put on the smart glasses.

In certain embodiments, when the user 102 begins to interact with the virtual reality device 130, the virtual reality device 130 (e.g., via the machine learning module 146) may determine and verify the identity of the user 102 based on image 148 of the user 102 and credentials of the user 102, similar to that described in FIG. 1.

The request 188 may be transmitted after the user 102 puts on the smart glasses. For example, the user 102 may initiate the request 188 by navigating menus and files from a display screen of the virtual reality device 130 and pressing a button on the user interface 134 (see FIG. 1) of the virtual reality device 130.

The request 188 may include the identifier associated with the use 102 (e.g., a name, a unique number, etc.), credentials associated with the user 102 (used to login into their account and to activate the virtual reality device 130), among other information associated with the user 102. The request 188 may also include information about the confidential data 174, such as identifier (e.g., a file name of the confidential data 174). The request 188 may also include information about the task that the user 102 wants to perform on the confidential data 174, a project title for which the user 102 wants to access the unmasked confidential data 174, etc.

The virtual reality device 130 transmits the request 188 to the LiFi device 160. In response, the LiFi device 160 may generate and communicate a blockchain data entry 212 to the blockchain network 200. The blockchain data entry 212 may be stored in a new block 212 in the blockchain 210. In this process, the LiFi device 160 may generate a hash value 218 for the blockchain data entry 212 based on the content of the blockchain data entry 212. The content of the blockchain data entry 212 may include the request 188 and/or any suitable data/instruction. The hash value 212 may be generated by applying a hash function to the request 188. The LiFi device 160 may store the blockchain data entry 216 as a new block 212 of data in the blockchain ledger 124 that is a distributed database among nodes 208a-n (see FIG. 1) of the blockchain network 200. The blockchain data entry 216 may indicate to determine whether the user 102 is authorized to access the unmasked confidential data 174.

The network node 208 (see FIG. 1) of the blockchain network 200 may receive the request 188 of the user 102 via the LiFi device 160. The network node 208 (see FIG. 1) (e.g., via the machine learning module 204 (see FIG. 1)) may request the authorities associated with the organization that the LiFi device 160 and/or the confidential data 174 belong whether the user 102 is authorized to access unmasked confidential data 174. The network node 208 may receive feedback 310 from the authorities regarding the user's authentication for accessing the unmasked confidential data 174, similar to that described in FIG. 1. The blockchain network 200 (e.g., via the machine learning module 204 (see FIG. 1) may also evaluate the access level 186 of the user 102, similar to that described in FIG. 1. If the feedback 310 indicates that the user 102 is not authorized to access the unmasked confidential data 174, the request 188 is denied. Otherwise, in response to the user 102 being authorized to access the unmasked confidential data 174, the blockchain network 200 may transmit a confirmation message 182 to the LiFi device 160, where the confirmation message 182 indicates that the user 102 is authorized to access the unmasked confidential data 174.

The LiFi device 160 receives the confirmation message 182. In response, the LiFi device 160 may unmask the masked confidential data 174. In this process, the LiFi device 160 may unmask the masked confidential data 174 by feeding the masked confidential data 174 to a decryption function 190 that is configured to unmask the masked confidential data 174 with a decryption key. In certain embodiments, the LiFi device 160 may perform a reversed or opposite of the operation that was performed in masking the confidential data 174 to unmask it. In certain embodiments, the LiFi device 160 may access the original confidential data 174 before it was masked instead of unmasking the masked confidential data 174. The LiFi device 160 (via the modulator 164) may modulate the optical signal or light emitting from the light source 166 with the unmasked confidential data 174, similar to that described above with respect to modulating the light with the masked confidential data 174.

Transmitting the Unmasked Data to a Virtual Reality Device

The LiFi device 160 may transmit or emit the optical signal or light modulated with the unmasked confidential data 174 to (or toward) the virtual reality device 130. In certain embodiments, the LiFi device 160 may emit the modulated optical signal or light using the light source 166 to the virtual reality device 130. In certain embodiments, the light source 166 may be switched on in response to the LiFi device 160 receiving the confirmation message 182, e.g., by a switch on instruction from the processor 162 or a network 208. In certain embodiments, the LiFi device 160 may transmit the modulated optical signal via intranet 110 to the virtual reality device 130.

The virtual reality device 130 receives the unmasked confidential data 174 from the LiFi device 160. The virtual reality device 130 displays the unmasked confidential data 174 on a display screen (e.g., transparent glasses) of the virtual reality device 130. The virtual reality device 130 may display the unmasked confidential data 174, e.g., as virtual objects, virtual data, in a virtual environment.

The virtual reality device 130 (via the GPS sensor 140) may determine the GPS location of the virtual reality device 130. The virtual reality device 130 may also have or be given the GPS locations of the LiFi device 160 and the receiving device 120. If the virtual reality device 130 determines that the virtual reality device 130 is moved outside of a threshold distance from at least one of the LiFi device 160 and/or the receiving device 120, the virtual reality device 130 may terminate receiving the unmasked confidential data 174 from the LiFi device 160. Otherwise, if the virtual reality device 130 determines that the virtual reality device 130 is within the threshold distance from at least one of the LiFi device 160 and/or the receiving device 120, the virtual reality device 130 may continue to receive the unmasked confidential data 174 from the LiFi device 160. The threshold distance maybe ten feet, twenty feet, or any other suitable distance, for example.

In certain embodiments, the LiFi device 160 may terminate transmitting or emitting the unmasked confidential data 174 if it determines that the virtual reality device 130 is moved outside of the threshold distance from at least one of the LiFi device 160 and/or the receiving device 120. This provides another practical application of improving the security of the confidential data 174 and protecting the confidential data 174 from unsupervised or unmonitored access if the user 102 moves away from the LiFi device 160 and/or the receiving device 120.

Example Method for Provisioning Secured Data Access

Figure 4:
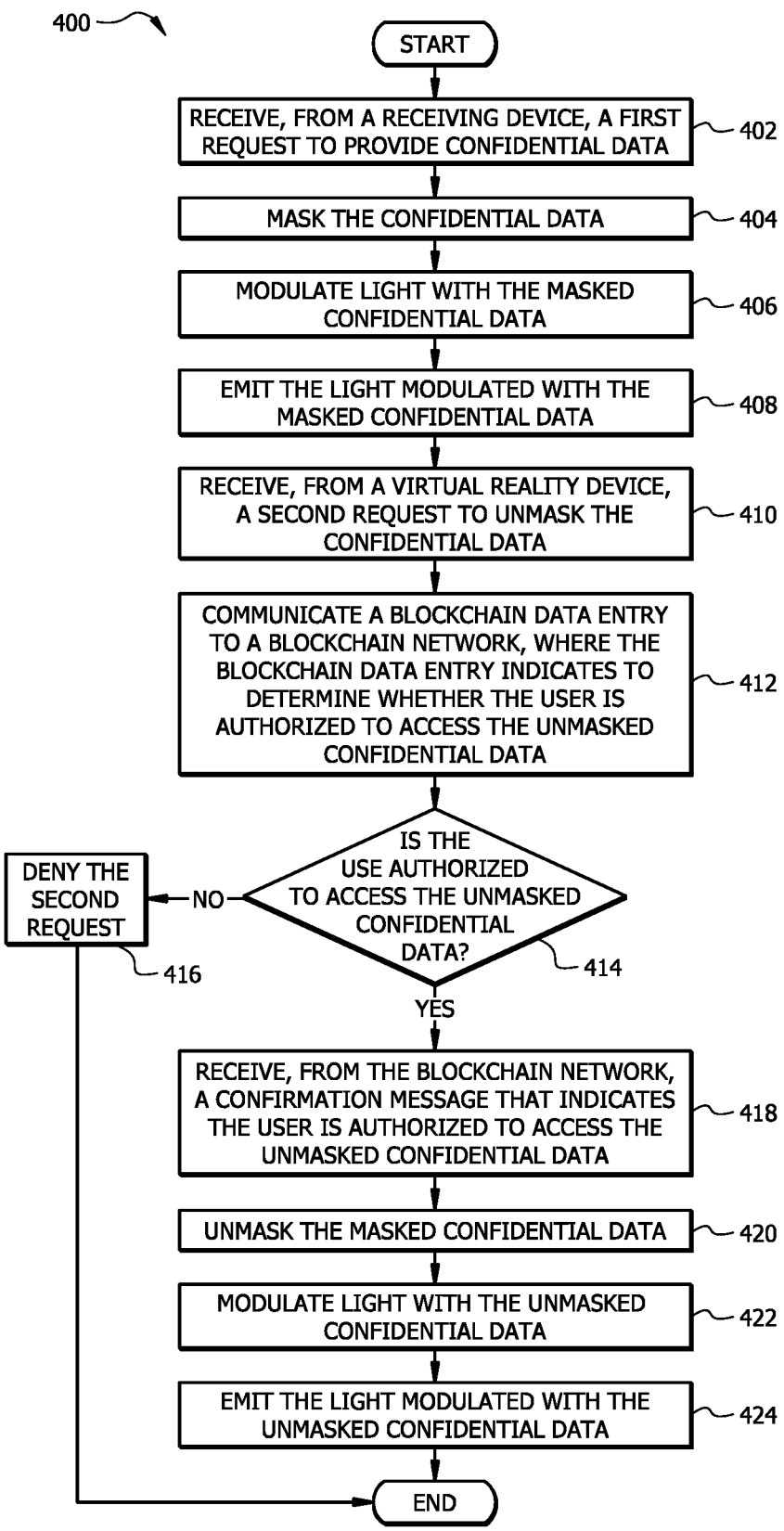
FIG. 4 illustrates an example flowchart of a method to provision secured data access to authorized users through LiFi data transmission and a virtual reality device.

FIG. 4 illustrates an example flowchart of a method 400 for provisioning secured data access to authorized users 102 via LiFi data transmission (e.g., from the LiFi device 160) and a virtual reality device 130. Modifications, additions, or omissions may be made to method 400. Method 400 may include more, fewer, or other operations. For example, operations may be performed in parallel or in any suitable order. While at times discussed as the system 100, LiFi device 160, or components of any of thereof performing operations, any suitable system or components of the system may perform one or more operations of the method 400. For example, one or more operations of method 400 may be implemented, at least in part, in the form of software instructions 172 of FIG. 1, stored on non-transitory, tangible, machine-readable media (e.g., memory 170 of FIG. 1) that when run by one or more processors (e.g., processors 162 of FIG. 1) may cause the one or more processors to perform operations 402-424.

At operation 402, the LiFi device 160 receives, from a receiving device 120, a first request 176 to provide confidential data 174. For example, the user 102 operating the receiving device 120 may want to perform a task that needs (or is associated with) the confidential data 174 and initiates the request 176 to receive the confidential data 174. At operation 404, the LiFi device 160 masks the confidential data 174, e.g., using the encryption function 180, similar to that described in FIG. 3.

At operation 406, the LiFi device 160 modulates light (e.g., optical signal) with the masked confidential data 174. For example, the LiFi device 160 may use the modulator 164 and/or the optical transceiver 167 to modulate the light with the masked confidential data 174, similar to that described in FIGS. 1 and 3.

At operation 408, the LiFi device 160 emits or transmits the light modulated with the masked confidential data 174. For example, the LiFi device 160 may emit or transmit the modulated light using the light source 166. For example, the LiFi device 160 may emit the modulated light to the receiving device 120 that is positioned in the propagation direction of the modulated light emitted from the LiFi device 160.

At operation 410, the LiFi device 160 receives, from the virtual reality device 130, a second request 188 to unmask the confidential data 174. For example, when the user 102 operates the virtual reality device 130, they may initiate the request 188 from the virtual reality device 130, similar to that described in FIGS. 1 and 3.

At operation 412, the LiFi device 160 communicates a blockchain data entry 216 to the blockchain network 200, where the blockchain data entry 216 indicates to determine whether the user 102 is authorized to access the unmasked confidential data 174, similar to that described in FIGS. 1-3.

At operation 414, it is determined whether the user 102 is authorized to access the unmasked confidential data 174. For example, the nodes 208 of blockchain network 200 and/or the LiFi device 160 may determine whether the user 102 is authorized to access the unmasked confidential data 174, e.g., via the machine learning module 204, feedback 310, and verifying the access level 186 of the user 102, similar to that described in FIGS. 1 and 3. If it is determined that the user 102 is authorized to access the unmasked confidential data 174, method 400 proceeds to operation 418. Otherwise, method 400 proceeds to operation 416. At operation 416, the LiFi device 160 denies the second request 188.

At operation 418, the LiFi device 160 receives, from the blockchain network 200, a confirmation message 182 that indicates the user 102 is authorized to access the unmasked confidential data 174.

At operation 420, the LiFi device 160 unmasks the masked confidential data 174. In certain embodiments, the LiFi device 160 may access the original confidential data 174 before it was masked.

At operation 422, the LiFi device 160 modulates light with the unmasked confidential data 174, e.g., using the modulator 164, and/or the optical transceiver 167. At operation 424, the LiFi device 160 emits the light modulated with the unmasked confidential data 174. For example, the LiFi device 160 may emit the modulated light to the virtual reality device 130 that is positioned in the propagation direction of the modulated light emitted from the LiFi device 160. In another example, the LiFi device 160 may transmit the optical signal to the virtual reality device 130 using the intranet 110. In certain embodiments, the virtual reality device 130 may be able to receive the light emitted from the LiFi device 160 as long as the virtual reality device 130 is in the propagation direction of the modulated light emitted from the LiFi device 160.

In certain embodiments, LiFi device 160 may emit or transmit light modulated with masked confidential data 174 to the virtual reality device 130 in response to receiving the request 188. The user 102 may select which part(s) of the confidential data 174 they want to access and view the unmasked data. The user selection may be sent to LiFi device 160 and forwarded to the blockchain network 200 in the blockchain data entry 216. If it is determined that the user 102 is authorized to view and access the selected part(s) of the confidential data 174, the LiFi device 160 may unmask or transmit the original version of the selected parts to the virtual reality device 130. In this way, the masking and unmasking of various parts of the confidential data 174 may be implemented dynamically.

In certain embodiments, if the virtual reality device 130 and/or the LiFi device 160 determine that the user 102 is not operating the virtual reality device 130 (e.g., when the user 102 no longer wears or puts on the virtual reality device 130), the confidential data 174 sent to the virtual reality device 130 may be dynamically masked by the virtual reality device 130 and/or the LiFi device 160. In certain embodiments, if the virtual reality device 130 and/or the LiFi device 160 determine that the user 102 is not operating the virtual reality device 130, the transmission or emission of the confidential data 174 may be terminated. In certain embodiments, if the virtual reality device 130 and/or the LiFi device 160 determine that the user 102 is not operating the virtual reality device 130, the display of the confidential data 174 may be terminated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a light fidelity (LiFi) device comprising:
  a memory configured to store confidential data;
  a light source configured to emit light;
  a processor operably coupled to the memory, and configured to:
    receive, from a receiving device, a first request to provide the confidential data;
    in response to receiving the first request, mask the confidential data;
    modulate the light with the masked confidential data;
    emit the light modulated with the masked confidential data toward the receiving device, wherein the receiving device is positioned in a direction of a propagation of the light;
    receive, from a virtual reality device, a second request to unmask the confidential data;
    in response to receiving the second request, communicate a blockchain data entry to a blockchain network, wherein the blockchain data entry indicates to determine whether a user is authorized to access the unmasked confidential data;
    in response to the user being authorized to access the unmasked confidential data, receive, from the blockchain network, a confirmation message that indicates the user is authorized to access the unmasked confidential data;
unmask the masked confidential data;
modulate the light with the unmasked confidential data; and
emit the light modulated with the unmasked confidential data toward the virtual reality device, wherein the virtual reality device is positioned in a direction of a propagation of the light.

2. The system of claim 1, further comprising the virtual reality device that comprises:
a global positioning system (GPS) sensor configured to detect a GPS location of the virtual reality device;
a second processor operably coupled to the GPS sensor, and configured to:
communicate the second request to the LiFi device;
receive the unmasked confidential data transmitted from the LiFi device;
display the unmasked confidential data on a display screen of the virtual reality device;
determine, based on the GPS location of the virtual reality device, that the virtual reality device is moved outside of a threshold distance from at least one of the LiFi device and the receiving device; and
terminate receiving the unmasked confidential data.

3. The system of claim 1, wherein: masking the confidential data comprises encrypting the confidential data with an encryption key; and unmasking the masked confidential data comprises decrypting the masked confidential data with a decryption key.

4. The system of claim 1, wherein the first request comprises at least one of an identifier of the user or credentials associated with the user.

5. The system of claim 1, wherein:
the virtual reality device comprises smart glasses; and
the second request is transmitted when the user wears the smart glasses.

6. The system of claim 1, wherein determining that the user is authorized to access the unmasked confidential data comprises:
accessing an access level associated with the user from a user profile associated with the user; and
determining that the access level indicates that the user is authorized to access the unmasked confidential data.

7. The system of claim 1, wherein the processor is further configured to:
in response to receiving the second request:
generate a hash value based at least in part upon the blockchain data entry, the hash value generated by applying a hash function on the second request;
generate the blockchain data entry comprising the hash value; and
store the blockchain data entry as a block of data in a blockchain ledger associated with the blockchain network, wherein the blockchain network comprises a plurality of network nodes, each network node from among the plurality of network nodes stores a copy of the blockchain ledger.

8. A method comprising:
receiving, from a receiving device, a first request to provide confidential data;
in response to receiving the first request, masking the confidential data;
modulating light with the masked confidential data;
emitting the light modulated with the masked confidential data toward the receiving device, wherein the receiving device is positioned in a direction of a propagation of the light;
receiving, from a virtual reality device, a second request to unmask the confidential data;
in response to receiving the second request, communicating a blockchain data entry to a blockchain network, wherein the blockchain data entry indicates to determine whether a user is authorized to access the unmasked confidential data;
in response to the user being authorized to access the unmasked confidential data, receiving, from the blockchain network, a confirmation message that indicates the user is authorized to access the unmasked confidential data;
unmasking the masked confidential data;
modulating the light with the unmasked confidential data; and
emitting the light modulated with the unmasked confidential data toward the virtual reality device, wherein the virtual reality device is positioned in a direction of a propagation of the light.

9. The method of claim 8, further comprising
communicating the second request to a light fidelity (LiFi) device;
receiving the unmasked confidential data transmitted from the LiFi device;
displaying the unmasked confidential data on a display screen of the virtual reality device;
determining, based on a global positioning system (GPS) location of the virtual reality device, that the virtual reality device is moved outside of a threshold distance from at least one of the LiFi device and the receiving device; and
terminating receiving the unmasked confidential data.

10. The method of claim 8, wherein: masking the confidential data comprises encrypting the confidential data with an encryption key; and
unmasking the masked confidential data comprises decrypting the masked confidential data with a decryption key.

11. The method of claim 8, wherein the first request comprises at least one of an identifier of the user or credentials associated with the user.

12. The method of claim 8, wherein:
the virtual reality device comprises smart glasses; and
the second request is transmitted when the user wears the smart glasses.

13. The method of claim 8, wherein determining that the user is authorized to access the unmasked confidential data comprises:
accessing an access level associated with the user from a user profile associated with the user; and
determining that the access level indicates that the user is authorized to access the unmasked confidential data.

14. The method of claim 8, further comprising,
in response to receiving the second request:
generating a hash value based at least in part upon the blockchain data entry, the hash value generated by applying a hash function on the second request;
generating the blockchain data entry comprising the hash value; and
storing the blockchain data entry as a block of data in a blockchain ledger associated with the blockchain network, wherein the blockchain network comprises a plurality of network nodes, each network node from among the plurality of network nodes stores a copy of the blockchain ledger.

15. A non-transitory computer-readable medium storing instructions, that when executed by one or more processors, cause the one or more processors to:
   receive, from a receiving device, a first request to provide confidential data;
   in response to receiving the first request, mask the confidential data;
   modulate light with the masked confidential data;
   emit the light modulated with the masked confidential data toward the receiving device, wherein the receiving device is positioned in a direction of a propagation of the light;
   receive, from a virtual reality device, a second request to unmask the confidential data;
   in response to receiving the second request, communicate a blockchain data entry to a blockchain network, wherein the blockchain data entry indicates to determine whether a user is authorized to access the unmasked confidential data;
   in response to the user being authorized to access the unmasked confidential data, receive, from the blockchain network, a confirmation message that indicates the user is authorized to access the unmasked confidential data;
   unmask the masked confidential data;
   modulate the light with the unmasked confidential data; and
   emit the light modulated with the unmasked confidential data toward the virtual reality device, wherein the virtual reality device is positioned in a direction of a propagation of the light.

16. The non-transitory computer-readable medium of claim 15,
   wherein the instructions when executed by the one or more processors, further cause the one or more processors to:
   communicate the second request to the LiFi device;
   receive the unmasked confidential data transmitted from a light fidelity (LiFi) device;
   display the unmasked confidential data on a display screen of the virtual reality device;
   determine, based on a global positioning system (GPS) location of the virtual reality device, that the virtual reality device is moved outside of a threshold distance from at least one of the LiFi device and the receiving device; and
   terminate receiving the unmasked confidential data.

17. The non-transitory computer-readable medium of claim 15, wherein: masking the confidential data comprises encrypting the confidential data with an encryption key; and unmasking the masked confidential data comprises decrypting the masked confidential data with a decryption key.

18. The non-transitory computer-readable medium of claim 15, wherein the first request comprises at least one of an identifier of the user or credentials associated with the user.

19. The non-transitory computer-readable medium of claim 15, wherein:
   the virtual reality device comprises smart glasses; and
   the second request is transmitted when the user wears the smart glasses.

20. The non-transitory computer-readable medium of claim 15, wherein determining that the user is authorized to access the unmasked confidential data comprises:
   accessing an access level associated with the user from a user profile associated with the user; and
   determining that the access level indicates that the user is authorized to access the unmasked confidential data.

* * * * *